United States Patent [19]
Brochette

[11] Patent Number: 5,466,126
[45] Date of Patent: Nov. 14, 1995

[54] BEARING FOR THE IMPELLER OF A FLUID METER

[75] Inventor: Hervé Brochette, Gumbrechtshoffen, France

[73] Assignee: Schlumberger Industries, S.A., Montrouge, France

[21] Appl. No.: 182,907

[22] Filed: Jan. 13, 1994

[30] Foreign Application Priority Data

Jan. 14, 1993 [FR] France .................... 93 00383

[51] Int. Cl.⁶ .................................. F04D 29/04
[52] U.S. Cl. ...................... 416/244 R; 416/93 R; 415/112
[58] Field of Search ............... 416/93 R, 244 R, 416/204 R; 415/111, 112

[56] References Cited

U.S. PATENT DOCUMENTS

| | | | |
|---|---|---|---|
| 3,149,819 | 9/1964 | Baumann et al. | 416/93 R |
| 3,385,516 | 5/1968 | Omohundro | 416/93 R |

FOREIGN PATENT DOCUMENTS

| | | | |
|---|---|---|---|
| 0140587 | 4/1951 | Australia | 415/112 |
| 1939160 | 2/1971 | Germany. | |
| 8616126 | 10/1986 | Germany. | |
| 0200699 | 12/1982 | Japan | 415/112 |
| 0001897 | 1/1986 | Japan | 416/93 R |
| 354952 | 7/1961 | Switzerland. | |
| 1021823 | 6/1983 | U.S.S.R. | 415/112 |
| 1169791 | 11/1969 | United Kingdom. | |
| 1175470 | 12/1969 | United Kingdom. | |

Primary Examiner—Edward K. Look
Assistant Examiner—Mark Sgantzos
Attorney, Agent, or Firm—Sanford J. Asman

[57] ABSTRACT

An impeller for a fluid meter, the impeller comprising a bearing including a central recess suitable for receiving a pivot, and including at the periphery of the central recess, open-ended fluting with adjacent flutes being separated by ribs. Axial passages are distributed around the fluting, with each passage co-operating with at least one flute in such a manner as to facilitate a flow of fluid via the passage to the detriment of a flow of the fluid along the flute. The impeller is applicable to metering fluids loaded with particles in suspension.

18 Claims, 3 Drawing Sheets

BEARING FOR THE IMPELLER OF A FLUID METER

The invention relates to an impeller for a fluid meter and to a fluid meter including such an impeller. It relates more particularly to the case where the fluid whose transmitted volume is to be estimated is a loaded fluid, i.e. a fluid which carries particles of various grain sizes in suspension (e.g. irrigation water that is loaded with sand or mud, or heating water that is loaded with metal particles).

BACKGROUND OF THE INVENTION

The present invention is equally applicable to single-jet type meters and to multijet type meters. The following description is given solely for a single-jet type meter, but it will be understood that it is immediately transposable to the multijet case.

FIG. 1 is a diagram of a single-jet fluid meter. The flowing fluid whose transmitted volume is to be measured penetrates into a measurement chamber 10 via an inlet duct 12 and leaves the chamber via an outlet duct 14 after causing an impeller 16 to rotate. The number of revolutions performed by the impeller is proportional to the volume transmitted. A magnet 18 is secured to the impeller and drives a magnetic metering system (not shown) contained in a summing mechanism 20. The summing mechanism 20 is separated from the measurement chamber 10 in sealed manner by means of a plate 22. The face of the plate 22 that faces the measurement chamber 10 supports a pivot 24 perpendicular to the fluid flow direction. The pivot 24 defines the axis of rotation of the impeller. In equivalent manner, the pivot could alternatively be fixed to the opposite bottom wall 26 of the measurement chamber.

The impeller 16 includes a bearing 28 which constitutes a central component engaging the pivot 24 while the impeller is rotating.

At low flow rates in the example shown in FIG. 1, the impeller rests against the bottom wall by means of a stud 30 placed at the outside end of the bearing. As the flow rate increases, the impeller rises and the end of the central recess in the bearing comes into abutment against the tip of the pivot.

When the flowing fluid is loaded, e.g. when it is desired to meter irrigation water or heating water, prior art impeller meters quickly become jammed. The fine particles and the metal particles in suspension in the fluid, e.g. sand, mud, or clay, accumulate between the bearing and the pivot, thereby clogging the equipment.

Such clogging enhances particle accumulation and very quickly rotation of the impeller about the pivot is completely jammed.

It can also happen that "large" particles (i.e. having a diameter in the range 0.05 mm to more than 1 mm), entrained by turbulence in the fluid created between the bearing and the pivot, directly jam rotation. Furthermore, clogging causes the shaft to wear and thus reduces sensitivity of the meter.

French patent No. 2 056 913 proposes forming axial grooves in the recess of the bearing in which the pivot is located. These grooves are separated by ribs that are narrower than the grooves and that have rounded edges. The presence of the ribs makes it possible to reduce the rubbing area between the pivot and the bearing, thereby increasing sensitivity. Furthermore, the grooves also allow the fluid to flow axially and consequently make it possible to evacuate impurities that run the risk of damaging the bearing. As a result clogging is slowed down. However, in practice it is observed that a meter provided with such a device and used for metering irrigation water operates for no more than a few thousand cubic meters. Consequently, its lifetime before jamming lies in the range of a few weeks to a few months at most. Although the grooves enable the clogging phenomenon to be slowed down, it nevertheless persists. Quite quickly, the grooves become clogged and jamming then takes place.

OBJECTS AND SUMMARY OF THE INVENTION

The present invention serves to avoid, or at least to slow down sufficiently, the phenomenon of clogging so as to guarantee that a meter used under such severe conditions has a lifetime of several years, e.g. a meter used for heavily loaded irrigation water or for heating water.

To this end, the invention provides an impeller for a fluid meter, the impeller including a bearing possessing a central recess suitable for receiving a pivot. The bearing comprising:

at the periphery of the central recess, open-ended fluting with adjacent flutes being separated by ribs; and axial passages distributed around the fluting, with each passage co-operating with at least one flute in such a manner as to facilitate a flow of fluid via said passage to the detriment of a flow of the fluid along the flute.

Advantageously, each flute has a hydraulic diameter $\underline{dh}$, and each passage has a hydraulic diameter DH that is not less than twice the hydraulic diameter $\underline{dh}$. Preferably, DH is substantially equal to 2.4 times $\underline{dh}$.

Advantageously, the axial passages are distributed around the fluting as close as possible to the fluting and to the central recess.

Advantageously, the fluting is uniformly spaced. In this configuration, each passage is placed between two flutes so as to co-operate therewith.

In an advantageous embodiment, each flute has a smallest radial dimension, each flute has a longitudinal opening, and said opening has a width that is less than said smallest radial dimension.

Advantageously, each rib has an edge that is re-entrant into the adjacent flute.

Advantageously, each rib has a surface contacting the concave pivot.

In the preferred embodiment, the fluting and the ribs are separated from the passages by walls, with the ends of said walls being chamfered so as to encourage the flow of fluid along the passages.

The invention also provides a fluid meter including such an impeller.

BRIEF DESCRIPTION OF THE DRAWINGS

The invention will be better understood on reading the following description given by way of non-limiting illustration and made with reference to the accompanying drawings, in which.

MORE DETAILED DESCRIPTION

Figure 1:
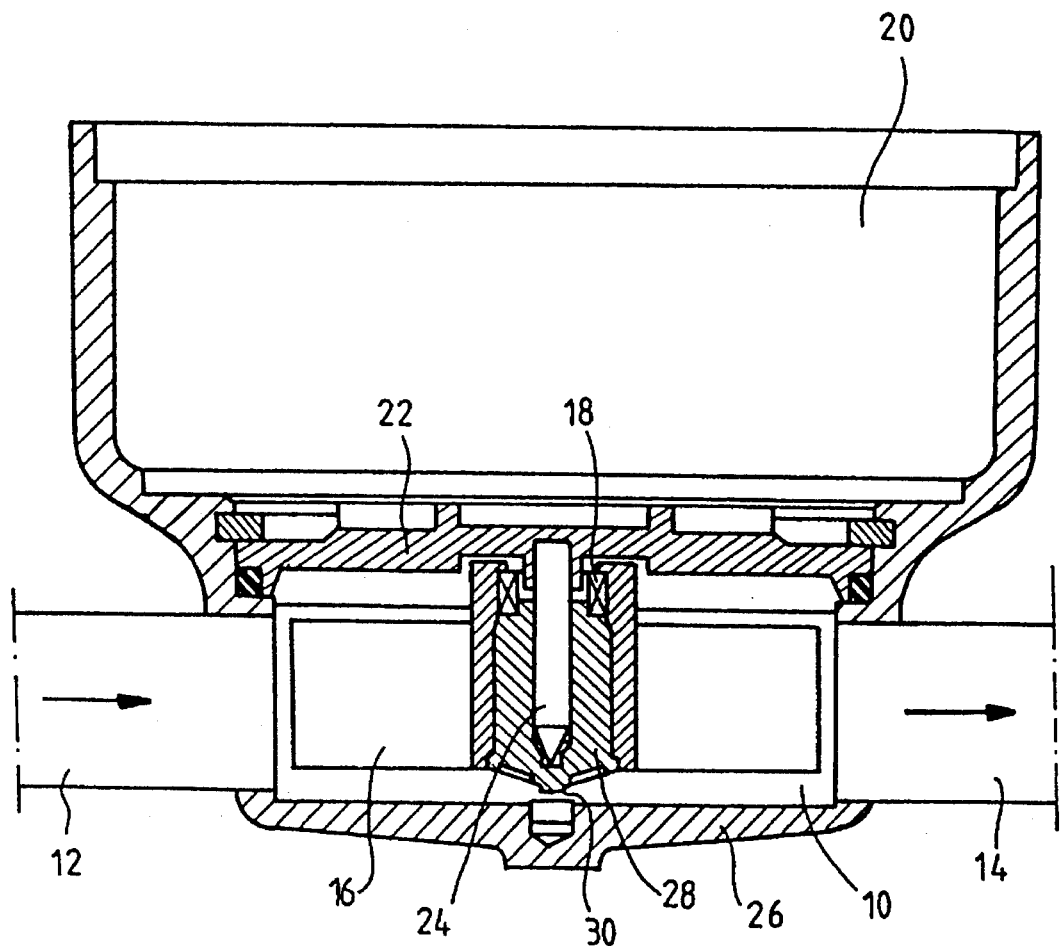
FIG. 1 is a diagrammatic section through a prior art fluid meter.
Figure 2:
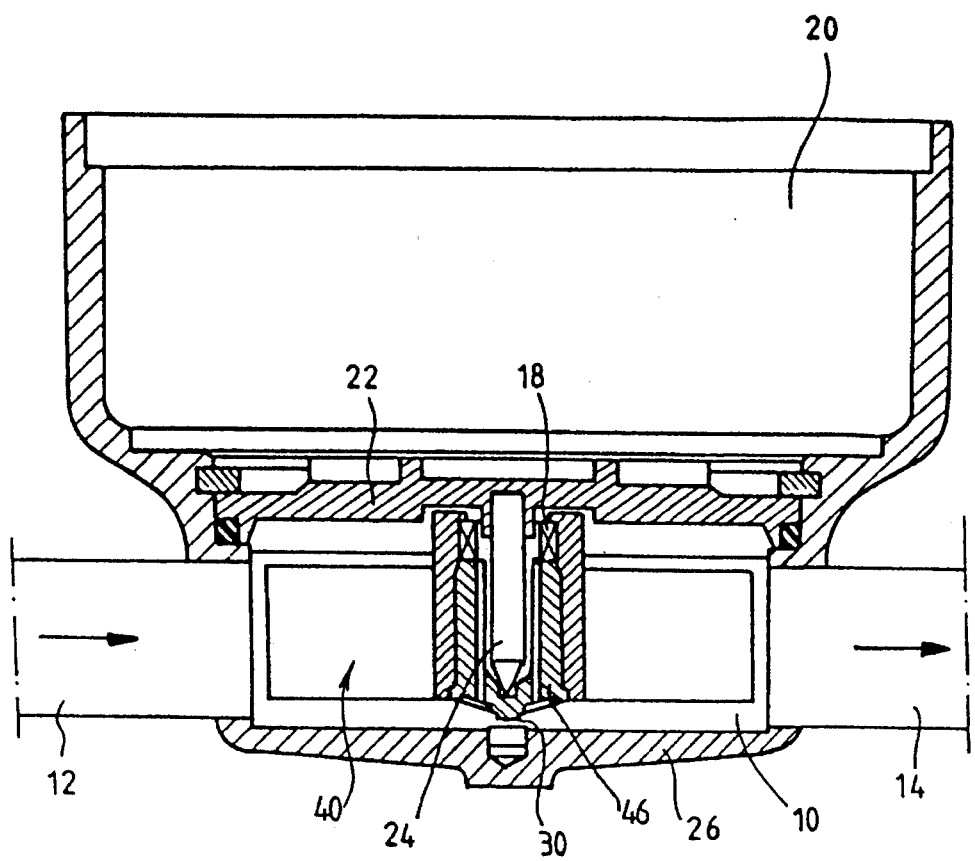
FIG. 2 is a diagrammatic section through a fluid meter of the invention.

FIG. 2 is a diagram of a fluid meter of the invention. References identical to references used in FIG. 1 designate the same items. As explained above, the fluid penetrates into the measurement chamber 10 via duct 12 and leaves via duct 14. The measurement chamber is filled with moving fluid and the flow drives the impeller 40 so that it rotates about the pivot 24. A flow of fluid is also established in the space that exists between the pivot 24 and the bearing 46. The impeller of the invention makes it possible to ensure that said flow of fluid does not cause clogging and thus jamming of impeller rotation.

Figure 3A:
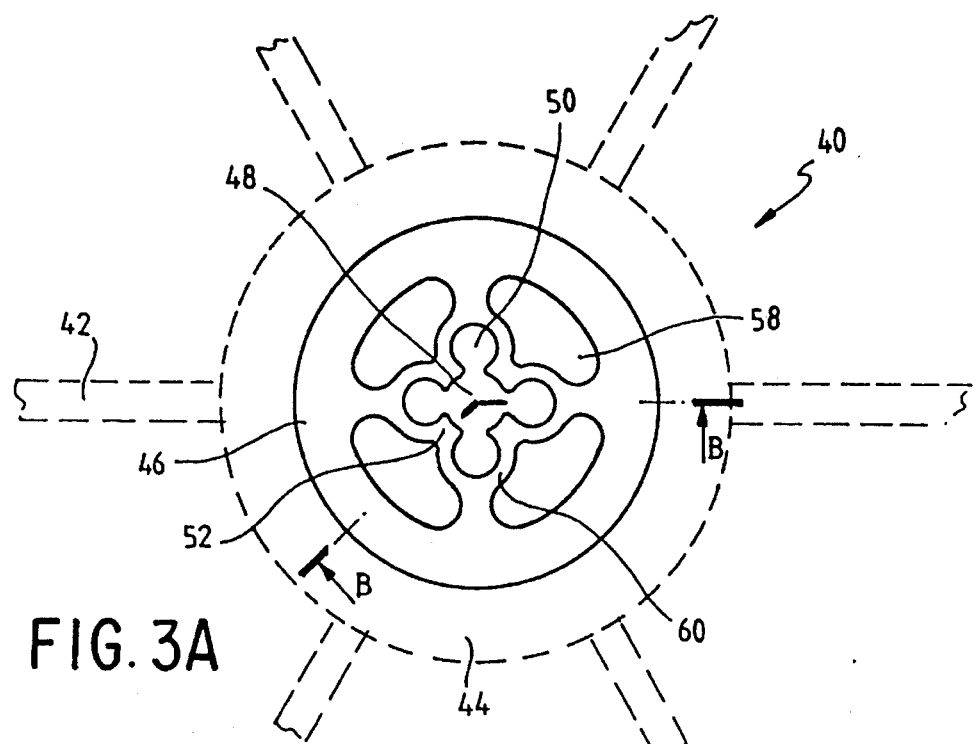
FIG. 3A is a diagrammatic plan view of a bearing for an impeller of the invention.

FIG. 3A is a diagrammatic plan view of the impeller 40.

The impeller 40 comprises a series of blades 42 (six in the example shown in FIG. 3A), but it will be understood that the number of blades may be different and depend on the intended specifications. The blades are regularly distributed around a hub 44 in which a bearing 46 is fixed.

Figure 3B:
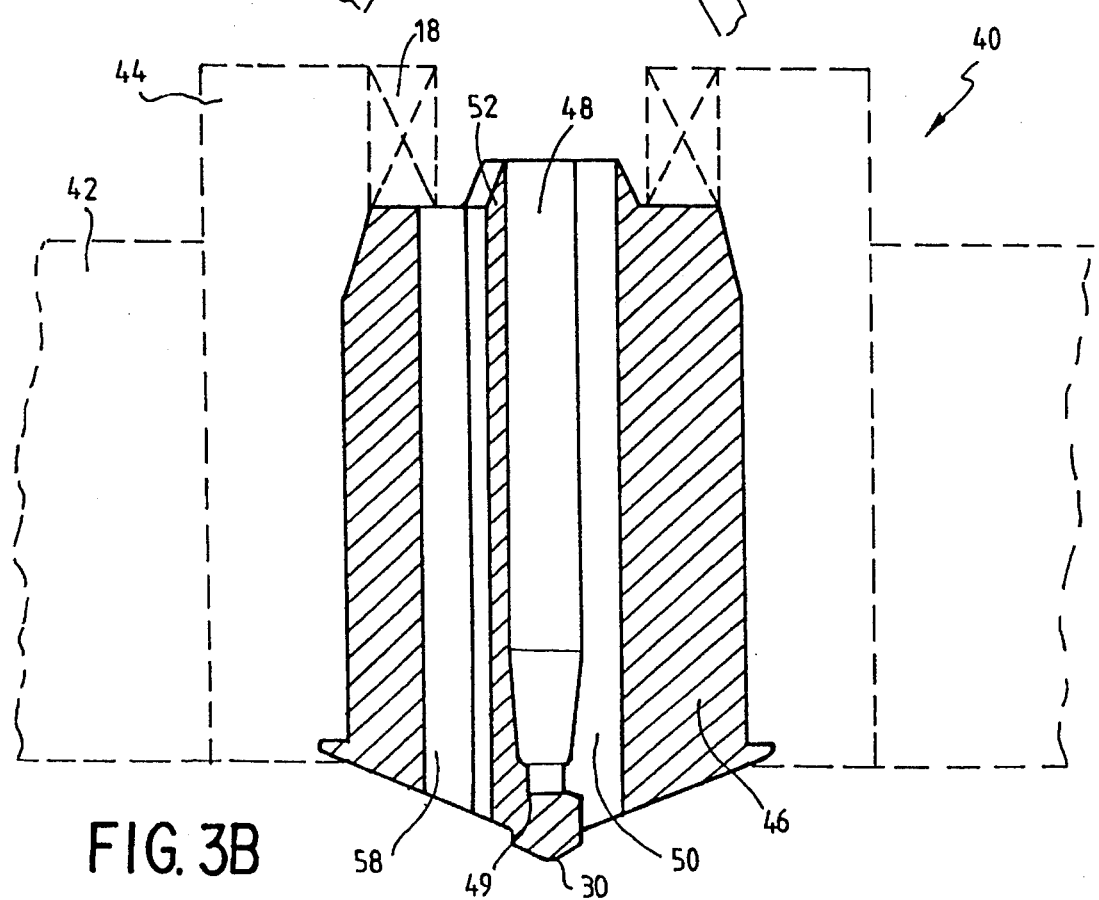
FIG. 3B is a diagrammatic section on line B—B of the view of FIG. 3A.

In this embodiment, the hub also serves as a support for a drive magnet 18 that is in the form of a ring, as can be seen in FIG. 3B. The bearing 46 is now described with reference to FIGS. 3A and 3B, FIG. 3B being a section through the impeller on line B—B of FIG. 3A.

In this embodiment, the bearing 46 is a cylindrical part having a central recess 48 suitable for receiving the pivot 24. The recess is closed by an abutment 49 whose outside stud-shape 30 enables the impeller to rotate on the bottom wall of the chamber when the flow is at a low rate.

At the periphery of the central recess 48, the bearing 46 includes axial fluting 50 with open ends, and of substantially cylindrical cross-section in the present case. The fluting may be shaped differently, however the cylindrical shape is the closest to the shape required for hydraulic purposes. That is to say that it is the shape closest to the shape adopted by the flow of the fluid.

In this embodiment there are four flutes, but that number is purely by way of example. The number of flutes depends on the diameter of the central recess and on the diameter of the bearing. The greater the diameter of the bearing, the greater the amount of room available for fluting. The fluting 50 is uniformly distributed around the axis of rotation of the impeller and adjacent flutes are separated by ribs 52.

Figure 4:
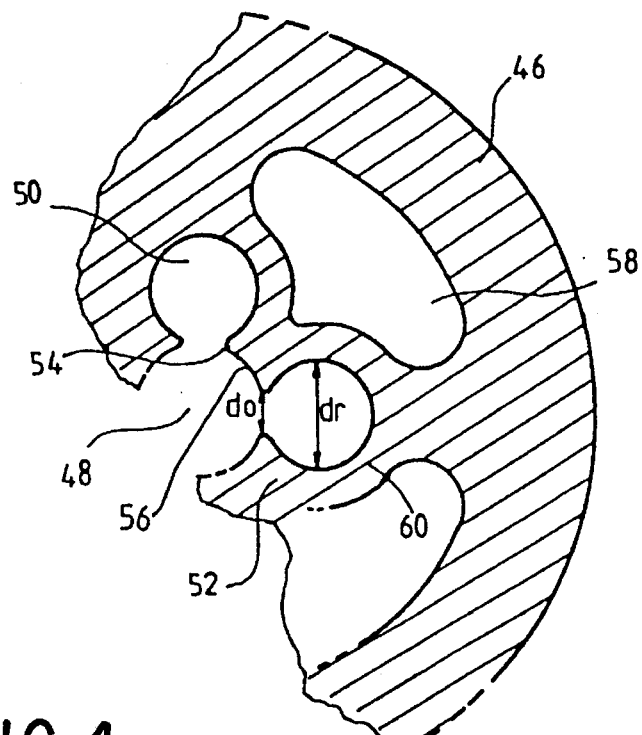
FIG. 4 is a fragment of the view of FIG. 3A on a larger scale.

FIG. 4 is a diagram showing a portion of FIG. 3A on a larger scale. This figure shows that in this embodiment each rib has a re-entrant edge 54, projecting into each adjacent flute. The gap between two facing re-entrant edges of two adjacent ribs thus forms an opening of the flute leading to the recess 48. The width $do$ of this opening is narrower than the smallest radial dimension $dr$ of a flute. If the fluting is cylindrical, then the smallest radial dimension thereof corresponds to its diameter.

As can also be seen in FIG. 4, the ribs 52 possess respective concave pivot-contacting surfaces 56. In this way, the ribs can withstand the very high pressures that occur between the pivot and the bearing without deforming.

Returning to FIGS. 3A and 3B, it can be seen that the bearing 46 includes axial passages 58 distributed around the fluting 50. These passages 58 co-operate with the fluting so as to enhance a flow of fluid via said passages to the detriment of a flow via the fluting.

Advantageously, to obtain such co-operation between a passage and a flute, the passages have a hydraulic diameter DH that is not less than twice the hydraulic diameter $dh$ of a flute. Hydraulic diameter defines a flow in an arbitrary section. In general, the hydraulic diameter D of a duct is obtained by the formula: $D=4\,S/P$ where S is equal to the section of the duct in which the fluid flows, and P is the perimeter of said section.

The hydraulic diameter DH of a passage may, for example, be substantially equal to 2.4 times the hydraulic diameter $dh$ of a flute.

In the embodiment shown in FIG. 3A, the hydraulic diameter of each flute 50 is equal to the geometrical diameter of the flute since the flutes are cylindrical.

In the example shown in FIG. 3A, each passage 58 co-operates with two flutes. The passages are therefore distributed over a diameter of the bearing and each passage lies between two flutes.

The passages are distributed around the flutes and are as close as possible thereto and to the central recess. For this purpose, the passages 58 are of a shape such that the wall 60 separating the passages from the flutes is as thin as possible. Nevertheless, the wall 60 must be thick enough to ensure that it is not deformed by the pressure of the flowing fluid.

As can be seen in FIG. 3B, the top end of said wall 60 is chamfered so as to enhance flow along the passages 58 to the detriment of flow along the fluting 50. For example, the chamfer angle may be equal to 15°.

The configuration of the bearing 46 of the impeller 40 makes it possible for the passages 58 to evacuate most of the flow of fluid created between the pivot and the bearing. These passages are large enough to avoid deposition and accumulation of particles that are in suspension in the fluid and that are entrained in the flow. A residual flow of fluid takes place via the fluting 50 but it is much smaller than in the prior art, thereby obtaining a corresponding reduction in the risks of jamming by clogging.

Furthermore, "large" particles (having a size of a few tenths of a millimeter) are entrained along the passages thus preventing them from becoming fixed between the bearing and the pivot.

It will be understood that this impeller can operate with single-jet meters or with multijet meters and that it can operate in various different configurations. Thus, the above description is given relative to a meter having a pivot axis that is fixed to the plate 22, but it is directly transposable to the case where the pivot is fixed to the bottom wall of the measurement chamber 10.

I claim:

1. An impeller for a fluid meter, comprising:
    a one piece bearing including a central recess for receiving a pivot, said bearing further comprising:
        a plurality of open-ended flutes located about a periphery of the central recess with adjacent flutes being separated by ribs; and
        axial passages distributed around the flutes, with each passage conducting a larger flow of fluid through said passage than a flow of fluid through each of the flutes.

2. An impeller according to claim 1, wherein each flute has a hydraulic diameter, and each passage has a hydraulic diameter that is not less than twice the hydraulic diameter of each flute.

3. An impeller according to claim 2, wherein the hydraulic diameter of each passage is substantially equal to 2.4 times the hydraulic diameter of each flute.

4. An impeller according to claim 1, wherein the passages are distributed proximate the flutes and proximate to the central recess.

5. An impeller according to claim 1, wherein the flutes are uniformly spaced about the periphery of the central recess.

6. An impeller according to claim 5, wherein each passage is placed between two flutes.

7. A impeller according to claim 1, wherein each flute has a smallest radial dimension, each flute has a longitudinal opening, and said opening has a width that is less than said smallest radial dimension.

8. An impeller according to claim 1, wherein each rib has a first edge that is re-entrant into one flute and a second edge that is re-entrant into an adjacent flute.

9. An impeller according to claim 1, wherein each rib has a concave surface for contacting the concave pivot.

10. An impeller according to claim 1, wherein the flutes and the ribs are separated from the passages by walls, with ends of said walls being chamfered to increase the flow of fluid along the passages.

11. An impeller according to claim 1, wherein each flute has two facing re-entrant edges.

12. An impeller for a fluid meter, comprising:
   a one-piece bearing including a central recess to receive a pivot, said bearing comprising:
      at a periphery of the central recess, open-ended fluting with adjacent flutes being separated by ribs, each flute having a hydraulic diameter; and
      axial passages distributed around the fluting proximate to the fluting and to said central recess with each passage having at least one associated flute and having a hydraulic diameter that is not less than twice a hydraulic diameter of each flute;
   wherein most of a fluid flow through said bearing is through said passages and only a residual flow of the fluid occurs through the flutes.

13. An impeller according to claim 12, wherein the hydraulic diameter of each passage is substantially equal to 2.4 times the hydraulic diameter of each flute.

14. An impeller according to claim 12, wherein the fluting is uniformly spaced about the periphery of the central recess.

15. An impeller according to claim 14, wherein each passage is placed over the center of two flutes.

16. An impeller according to claim 12, wherein each flute has a smallest radial dimension, each flute has a longitudinal opening, and said opening has a width that is less than said smallest radial dimension.

17. An impeller according to claim 12, wherein each rib has a concave surface for contacting said pivot.

18. An impeller according to claim 12, wherein the fluting and the ribs are separated from the passages by walls, with the ends of said walls being chamfered so as to encourage the flow of fluid along the passages.

* * * * *